United States Patent
Anazawa et al.

(10) Patent No.: US 7,309,404 B2
(45) Date of Patent: Dec. 18, 2007

(54) MANUFACTURING APPARATUS AND METHOD FOR CARBON NANOTUBE

(75) Inventors: Kazunori Anazawa, Nakai-machi (JP); Kentaro Kishi, Nakai-machi (JP); Masaki Hirakata, Nakai-machi (JP); Hiroyuki Watanabe, Nakai-machi (JP); Masaaki Shimizu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 738 days.

(21) Appl. No.: 10/646,834

(22) Filed: Aug. 25, 2003

(65) Prior Publication Data

US 2004/0168904 A1 Sep. 2, 2004

(30) Foreign Application Priority Data

Feb. 27, 2003 (JP) ............................. 2003-051599

(51) Int. Cl.
*B01J 19/08* (2006.01)
(52) U.S. Cl. ................................... 204/173; 423/447.3
(58) Field of Classification Search ................. 204/173; 423/447.3
See application file for complete search history.

(56) References Cited

U.S. PATENT DOCUMENTS

| 7,052,667 B2 * | 5/2006 | Loutfy et al. ............ 423/447.1 |
| 2002/0179428 A1 | 12/2002 | Anazawa et al. |
| 2006/0057037 A1 | 3/2006 | Anazawa et al. |

FOREIGN PATENT DOCUMENTS

| JP | A-2002-154813 | 5/2002 |
| JP | A 2002-164042 | 6/2002 |
| JP | A-2002-220215 | 8/2002 |
| JP | A 2002-237302 | 8/2002 |
| JP | A 2002-308665 | 10/2002 |
| JP | 2002-356316 A | * 12/2002 |
| JP | A-2002-348108 | 12/2002 |
| JP | A-2002-356316 | 12/2002 |
| JP | A 2002-356316 | 12/2002 |
| JP | A 2003-080062 | 3/2003 |

OTHER PUBLICATIONS

Anazawa et al., "High-purity carbon nanotubes synthesis method by an arc discharging in magnetic field", Applied Physics Letters, 2002, vol. 81, No. 4, pp. 739-741.

Abe, Ikuo et al. "Preparation of carbonaceous adsorbents for removal of chloroform from drinking water," Carbon, vol. 39 1069-1073 pp, XP-002393819 (2001).

* cited by examiner

*Primary Examiner*—Kishor Mayekar
(74) *Attorney, Agent, or Firm*—Oliff & Berridge, PLC

(57) ABSTRACT

Provided is a manufacturing apparatus for a carbon nanotube, including: at least two electrodes whose tips are opposed to each other, and a power supply that applies a voltage between the two electrodes to generate discharge plasma in a discharge area between the two electrodes. By using a porous carbonaceous material for at least one of the two electrodes, it is possible to provide a manufacturing apparatus and method for a carbon nanotube, which are capable of manufacturing at a low cost the carbon nanotube that is inexpensive and has a further higher purity.

9 Claims, 9 Drawing Sheets

SEM PHOTOGRAPH SHOWING SURFACE OF BINCHOTAN CHARCOAL

SEM PHOTOGRAPH SHOWING MANUFACTURED CARBON NANOTUBE
(MAGNIFYING POWER OF 100)

SEM PHOTOGRAPH SHOWING MANUFACTURED CARBON NANOTUBE
(MAGNIFYING POWER OF 5000)

SEM PHOTOGRAPH SHOWING CARBON NANOTUBE MANUFACTURED WITHOUT USING PERMANENT MAGNET (MAGNIFYING POWER OF 100)

SEM PHOTOGRAPH SHOWING CARBON NANOTUBE MANUFACTURED WITHOUT USING PERMANENT MAGNET (MAGNIFYING POWER OF 5000)

MANUFACTURING APPARATUS AND METHOD FOR CARBON NANOTUBE

FIELD OF THE INVENTION AND RELATED ART STATEMENT

The present invention relates to a manufacturing apparatus and method for a carbon nanotube whose industrial availability has been attracting attention in recent years.

The carbon nanotube has an extremely finer diameter than that of a general carbon fiber, a high Young's modulus, and a high electrical conductivity, thereby attracting attention as a new industrial material.

A material having a diameter of 1 µm or smaller which is finer than the carbon fiber is generally called a carbon nanotube and distinguished from the carbon fiber. However, there is no particularly definite boundary therebetween. By a narrow definition, the material whose hexagonal mesh carbon surface is substantially parallel to an axis is called a carbon nanotube, and even a variant of the carbon nanotube, around which amorphous carbon exists, is included in the carbon nanotube (Note that the narrow definition is applied to the carbon nanotube according to the present invention.).

Usually, the narrowly-defined carbon nanotube is further classified into two types: a carbon nanotube having a structure with a single hexagon mesh tube (graphene sheet) is called a single wall nanotube (hereinafter, simply referred to as "SWNT" in some cases); and on the other hand, a carbon nanotube made of multilayer graphene sheets are called a multi-wall nanotube (hereinafter, simply referred to as "MWNT" in some cases). The carbon nanotubes of these types each have an extremely finer diameter than that of the carbon fiber, a high Young's modulus, and a high electrical conductivity, thereby attracting attention as a new industrial material.

Thus, the carbon nanotube is a new material whose structural element is only carbon, and is mechanically extremely strong enough to exceed a Young's modulus of 1 TPa. In addition, electrons flowing through the carbon nanotube easily undergo ballistic transport, so that it is possible to cause a large quantity of current to flow through the carbon nanotube. Further, the carbon nanotube has a high aspect ratio, so that its application to a field electron emitting source is under way, and a light emitting element and display having a high brightness is under development. Furthermore, some single wall carbon nanotubes exhibit semiconductor characteristics, and are applied to the experimental manufacture of a diode and a transistor. Therefore, applications of the single wall nanotubes are especially desired in a field of functional materials and in a field of an electronic industry.

Conventionally, it has been known that fullerenes and carbon nanotubes can be manufactured by methods including resistance heating, plasma discharge such as arc discharge with a carbon rod as a raw material, laser ablation, and chemical vapor deposition (CVD) using acetylene gas. However, a mechanism of generating carbon nanotubes with those methods is controversial in various respects, and a detailed growth mechanism is not disclosed even now.

With regard to the manufacture of a carbon nanotube, various methods and improvements have been studied mainly for the purpose of synthesis in a large quantity. The resistance heating which was devised in the early stage is a method of heating and vaporizing graphite by bringing the forward ends of two pieces of graphite in contact with each other in a rare gas, and then applying a current of several tens to several hundreds of amperes. However, with this method, it is extremely difficult to obtain a few grams of specimen, so that the method is hardly used now.

The arc discharge is a method of synthesizing fullerenes and carbon nanotubes by generating arc discharge in a rare gas such as He and Ar while using graphite rods as an anode and a cathode. The forward end portion of the anode reaches a high temperature of approximately 4000° C. or more by arc plasma generated by the arc discharge, then the forward end portion of the anode is vaporized, and a large quantity of carbon radicals and neutral particles are generated. The carbon radicals and neutral particles repeat collision in the plasma, further generate carbon radicals and ions, and become soot containing fullerenes and carbon nanotubes to be deposited around the cathode and the electrodes and on the inner wall of an apparatus. When the anode includes an Ni compound, a ferrous compound, or a rare earth compound, which acts as catalyst, single wall carbon nanotubes can be synthesized efficiently.

The laser ablation is a method of irradiating a pulse YAG laser beam on a graphite target and generating high-density plasma on the surface of the graphite target to generate fullerenes and carbon nanotubes. The feature of the method is that a carbon nanotube having a relatively high purity can be obtained even at a growth temperature exceeding 1000° C.

The chemical vapor deposition is a method of generating a carbon nanotube by a chemical decomposition reaction of the raw material gas, using an acetylene gas, a methane gas, or the like containing carbon as a raw material. The chemical vapor deposition depends on a chemical reaction occurring in a thermal decomposition process of the methane gas and the like serving as the raw material, thereby enabling the manufacture of a carbon nanotube having a high purity.

Incidentally, the carbon nanotubes synthesized using those synthesis methods are more expensive than other materials. This is not only because the market for a carbon nanotube itself is yet to mature, but also because a method enabling reduction of a manufacturing cost is yet to be found. In particular, under the current circumstances, the arc discharge which is a method capable of manufacturing a carbon nanotube that has high crystallinity with few defects is higher in the manufacturing cost than that of the chemical vapor deposition.

SUMMARY OF THE INVENTION

The present invention has been made in view of the above circumstances and provides a manufacturing apparatus and method for a carbon nanotube, which are capable of manufacturing the carbon nanotube at a low cost. Further, the present invention provides a manufacturing apparatus and method for a carbon nanotube, which are capable of manufacturing the carbon nanotube that is inexpensive and has a further higher purity.

According an aspect of the present invention, the manufacturing apparatus for a carbon nanotube has:

at least two electrodes whose tips are opposed to each other; and at least a power supply that applies a voltage between the two electrodes to generate discharge plasma in a discharge area between the two electrodes, in which at least one of two electrodes whose tips are opposed to each other is made of a porous carbonaceous material.

According another aspect of the present invention, the manufacturing method for a carbon nanotube has:

applying a voltage between two electrodes whose tips are opposed to each other;

generating discharge plasma in a discharge area between the two electrodes; and using an electrode made of a porous carbonaceous material as at least one of the two electrodes whose tips are opposed to each other.

In a method of manufacturing a carbon nanotube using discharge plasma such as arc discharge, generally, a high-purity graphite rod is used as an electrode material. However, the graphite rod is expensive, leading to great increase in the manufacturing cost for the carbon nanotube. Accordingly, the cost of the carbon nanotube itself is increased.

On the other hand, in the present invention, the porous carbonaceous material whose unit price is incomparably lower than the graphite rod is used as the electrode material. According to the present invention, a carbon nanotube can be manufactured in the same manner as in the case of using the high-purity graphite rod as the electrode material. In addition, the electrode material is inexpensive, so that the manufacturing cost can be greatly reduced, thereby realizing the stable supply of inexpensive carbon nanotubes. Accordingly, it is contemplated that the present invention will spur research and development in the field of nanotechnology, and can largely contribute to commercialization of the carbon nanotube.

In the present invention, it is preferable that the porous carbonaceous material be subjected to a dehydration process prior to the generating of the discharge plasma in the discharge area between the two electrodes. Further, it is preferable that the specific porous carbonaceous material be binchotan charcoal or bamboo charcoal. Note that it is preferable that the electrode made of the porous carbonaceous material be used as at least an anode of the two electrodes whose tips are opposed to each other.

In the manufacturing apparatus for a carbon nanotube according to the present invention, in order to increase the purity of the carbon nanotube, it is preferable to include a magnetic field generating unit that forms, in a generation area of the discharge plasma, at least a magnetic field having lines of magnetic force in multiple directions or a magnetic field having a component in parallel with a flowing direction of a discharge current. In this case, it is preferable that the discharge plasma generated in the discharge area be arc plasma.

On the other hand, in the manufacturing method for a carbon nanotube according to the present invention, it is preferable to form, in the generation area of the discharge plasma, at least one of the magnetic field having the lines of magnetic force in the multiple directions and the magnetic field having the component in parallel with the flowing direction of the discharge current. In this case, it is preferable that the discharge plasma generated in the discharge area be arc plasma.

BRIEF DESCRIPTION OF THE DRAWINGS

A preferred embodiment of the present invention will be described in detail based on the following drawings, wherein.

DETAILED DESCRIPTION OF THE PREFERRED EMBODIMENT

Figure 1:
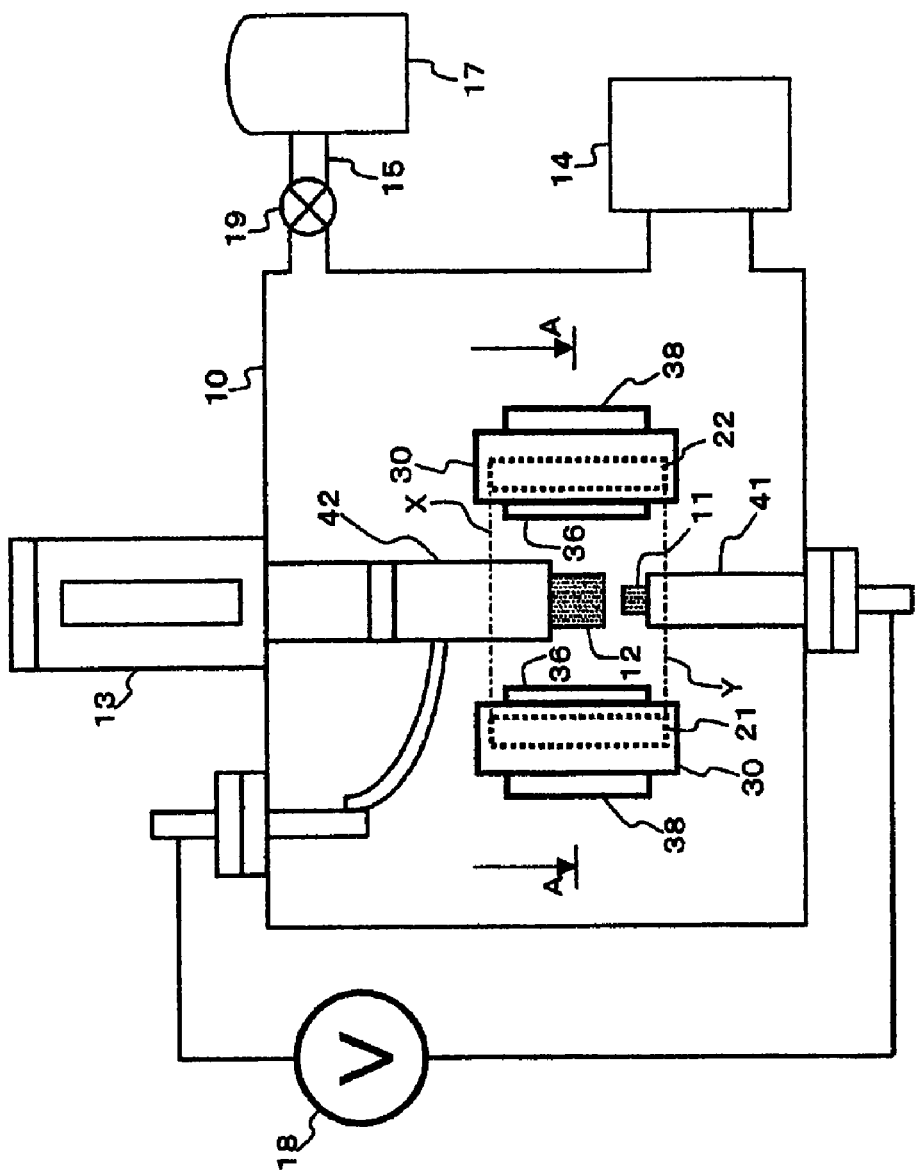
FIG. 1 is a schematic cross sectional view showing an example of an apparatus for manufacturing a carbon nanotube according to the present invention.

Hereinbelow, detailed description is made of the present invention.

In a manufacturing apparatus and method for a carbon nanotube of the present invention, it is a key factor to use an electrode made of a porous carbonaceous material for at least one of the two opposing electrodes. First, detailed description is made of the porous carbonaceous material characterizing the present invention.

The term "porous carbonaceous material" used in the present invention represents a porous material made of carbon including a powder material such as activated carbon, but mainly indicates charcoal. The porous carbonaceous material such as charcoal is available at a low cost, thereby making it possible to greatly reduce the cost for manufacturing a carbon nanotube. The porous carbonaceous material to be used in the present invention needs to have an electrical conductivity enough to generate discharge plasma as a precondition. The electrical conductivity needed for generation of the discharge plasma varies depending on a type of discharge plasma, an application voltage, a distance between two electrodes, and the like.

Also, in order to function as an electrode, the porous carbonaceous material naturally needs to have a hardness enough to retain a predetermined shape of the electrode. There is no particular limitation to the shape retention or the hardness as long as the porous carbonaceous material can function as the electrode upon generating the discharge plasma. In the case where the powder material such as activated carbon is used as the porous carbonaceous material, the porous carbonaceous material is hardened so as to function as the electrode by being compressed or the like.

From the viewpoint of the electrical conductivity and the shape retention described above, as the porous carbonaceous material to be used in the present invention, binchotan charcoal or bamboo charcoal is particularly preferable. Those materials are widely distributed on the market, and are available at extremely low costs.

An electric resistivity of the porous carbonaceous material to be used in the present invention depends on various factors as described above, but is preferably set to approximately 0.01 $\Omega\cdot m$ to 10 $\Omega\cdot m$, and more preferably set to approximately 0.01 $\Omega\cdot m$ to 0.1 $\Omega\cdot m$.

The hardness of the porous carbonaceous material to be used in the present invention also depends on various factors as described above, but if discussed as a hardness measured by a Miura hardness tester for charcoal, is preferably set to approximately 5 or more, and more preferably set to approximately 10 or more. However, the above-mentioned criterion does not apply to a hardness in the case of using compressed powder such as activated carbon. In this case, in a pencil hardness test, the hardness is preferably set to at least 6B or more as a pencil scratch value.

The porous carbonaceous material (charcoal) is obtained by burning a carbon-containing raw material (particularly, plant) such as wood or bamboo. In order to manufacture the porous carbonaceous material having the above-mentioned characteristics, it is desirable to adjust a burning temperature appropriately in its manufacturing process. Specifically, the burning temperature is preferably set to 700° C. or more, more preferably set to a range of 850 to 2500° C., and still more preferably set to a range of 1000 to 2500° C. If the burning temperature is too low, the porous carbonaceous material may not ensure a sufficient electrical conductivity.

The shape, size, etc. of the porous carbonaceous material to be used as the electrode have no particular limitation, and are also desired to be in desirable ranges of those of a general electrode.

In many cases, the porous carbonaceous material has a high moisture content due to its porosity. The high moisture content may affect its dischargeability, so that it is preferable to subject the porous carbonaceous material to a dehydration process before the discharge plasma is generated in a discharge area between the two electrodes. By using a porous carbonaceous material thus dehydrated as the porous carbonaceous material, the satisfactory dischargeability can be obtained and a high-purity carbon nanotube can be manufactured with high manufacturing efficiency.

Specific methods of dehydrating the porous carbonaceous material include: a method of transpiring moisture due to heat by heating the porous carbonaceous material at a predetermined temperature during a predetermined time period (hereinafter, referred to as "heat dehydration method"); a method of entraining moisture by subjecting the porous carbonaceous material to vacuum degasification within a sealed container; and a method of absorbing moisture by placing the porous carbonaceous material within a sealed container together with a hygroscopic agent such as calcium carbonate, but are not limited to those methods. In addition, by combining various methods, the methods may be performed simultaneously or sequentially.

If the dehydration process is used, the satisfactory dischargeability can be obtained more reliably than the case without any pretreatment, thereby enabling a carbon nanotube to have a higher purity and higher effectiveness. A target moisture content at this time depends on various factors, but is preferably set to approximately 1% by mass or less, and more preferably set to 0.1% by mass or less.

In order to obtain a satisfactory moisture content described above, whichever type of dehydration process is adopted, various conditions (temperature, time, air pressure, amount of a hygroscopic agent, etc.) may be adjusted appropriately. However, in order to attain high dehydration efficiency with more ease and for a shorter period of time, it is desirable to adopt the heat dehydration method.

The conditions for the heat dehydration method may be appropriately set based on the moisture content of the porous carbonaceous material before the dehydration process, the target moisture content, etc. More specifically, the heating temperature is preferably set to 100° C. or more, and more preferably set to 200° C. or more, and the heating time is preferably set to 30 minutes or more, and more preferably set to 60 minutes or more.

In the manufacturing apparatus and method for a carbon nanotube of the present invention, at least one of two electrodes whose tips are opposed to each other is made of the above-mentioned porous carbonaceous material. By applying a voltage between the two electrodes whose tips are opposed to each other, the discharge plasma is generated in a discharge area between the two electrodes, thereby manufacturing the carbon nanotube. According to the present invention, it is desirable to form a predetermined magnetic field in the discharge area. The above-mentioned porous carbonaceous material itself to be used in the present invention essentially includes impurities, and therefore the carbon nanotube to be manufactured tends to include more or less inorganic impurities. However, by forming a predetermined magnetic field in the discharge area, the manufacturing efficiency of the carbon nanotube improves with respect to carbon within the porous carbonaceous material, with the result that the purity and generation efficiency of the carbon nanotube can be enhanced.

Here, the term "predetermined magnetic field" includes in the generation area of the discharge plasma at least: a magnetic field having lines of magnetic force in multiple directions; or a magnetic field having a component parallel with a flowing direction of the discharge current. Hereinafter, detailed description is made of a preferred embodiment including a structure in which the predetermined magnetic field is formed in the discharge area.

Figure 2:
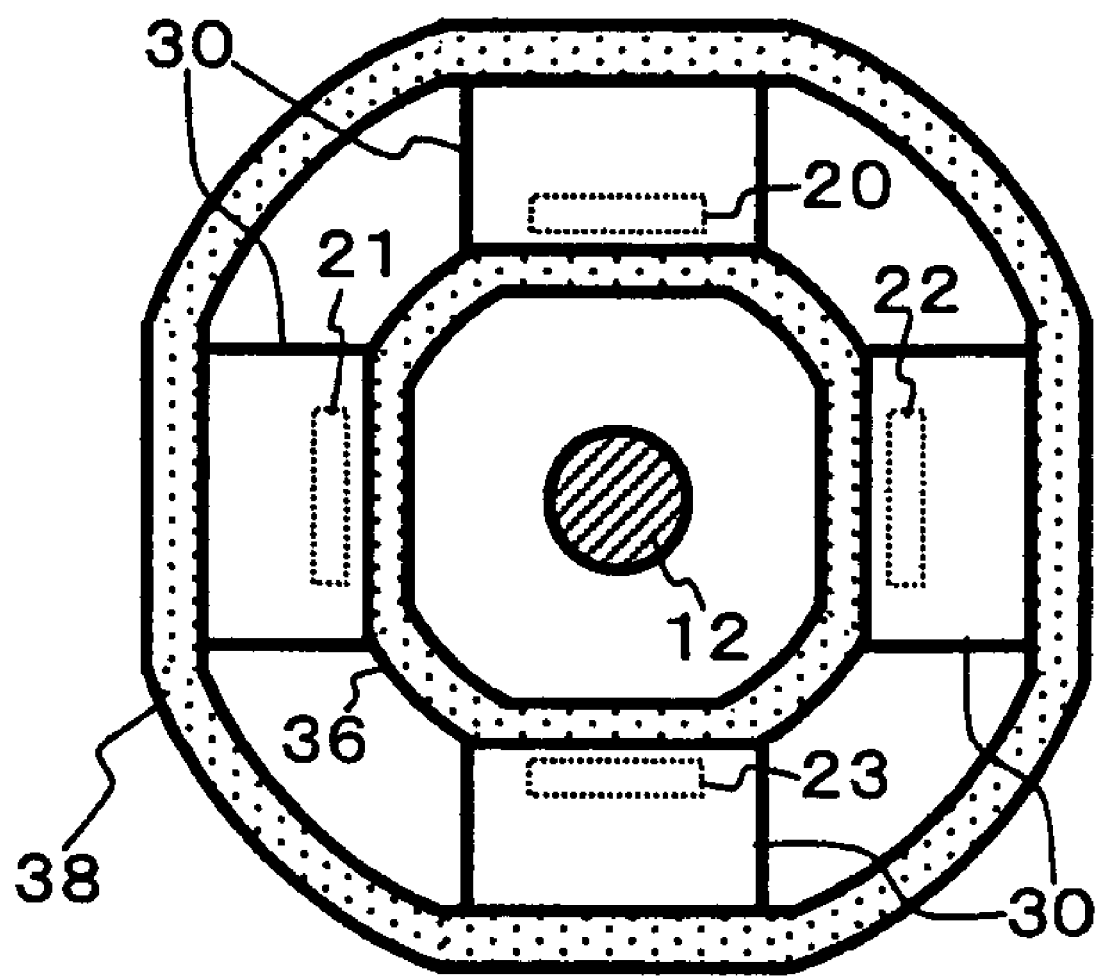
FIG. 2 is a cross sectional view taken along a line A-A of FIG. 1.

FIG. 1 is a schematic cross sectional view showing an example of the manufacturing apparatus for a carbon nanotube according to the present invention, and FIG. 2 is a cross sectional view taken along the line A-A of FIG. 1. The carbon nanotube manufacturing apparatus shown in FIG. 1 further includes permanent magnets 20 to 23 in addition to a conventional carbon nanotube manufacturing apparatus using discharge plasma. The permanent magnets 20 to 23 are arranged along the flowing direction of the discharge current to surround the discharge area. The part corresponding to the conventional carbon nanotube manufacturing apparatus includes: two electrodes (an electrode 12 of a porous carbonaceous material serving as an anode, and an electrode 11 serving as a cathode) which are respectively held by holders 41 and 42, and disposed in a reaction container (chamber) 10 used as a sealed container, and whose tips are opposed to each other; a moving apparatus 13 which can slide the holder 42 holding the electrode 12 for adjusting the interval between the electrode 11 and the electrode 12; a power supply 18 for applying a voltage between the electrodes 11 and 12; a vacuum pump 14 capable of decompressing the atmosphere in the reaction container 10; a gas cylinder 17 for storing desired gas; an inlet tube 15 interconnecting between the gas cylinder 17 and the reaction container 10; and an atmosphere adjusting unit including a valve 19 for opening/closing the interconnection.

That is, the permanent magnets 20 to 23 generate a predetermined magnetic field in the discharge area between the electrodes 11 and 12 where the discharge plasma is generated when a voltage is applied between the electrodes 11 and 12. Note that since the permanent magnets 20 to 23 are completely surrounded by heat releasing members 30, which are a part of the cooling unit, these magnets are represented by a dotted line in FIGS. 1 and 2. The cooling unit is detailed later.

Examples of the formed predetermined magnetic field specifically include (1) a magnetic field space which is surrounded and is enclosed by lines of magnetic force in multiple directions, and (2) a magnetic field space where the lines of magnetic force are approximately in parallel with the flowing direction of the discharge current, and thus, the motion of the charged particles in the discharge plasma is restricted by the lines of magnetic force. As in this example, when the four permanent magnets are used, it is possible to form a magnetic field in the form of (1).

Figure 3A:
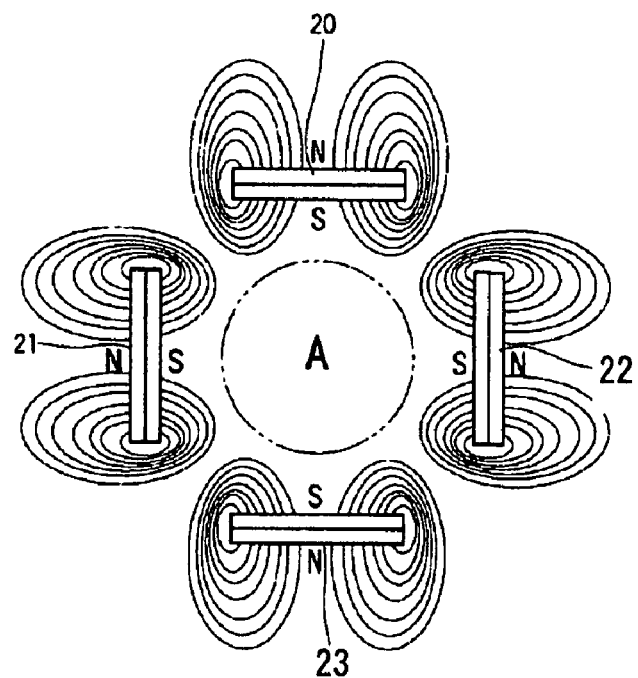
FIG. 3(a) shows states of the lines of magnetic force where only permanent magnets are extracted from FIG. 2 and magnetic poles are determined, in which a state where all the permanent magnets are arranged such that the S pole faces a discharge area.
Figure 3B:
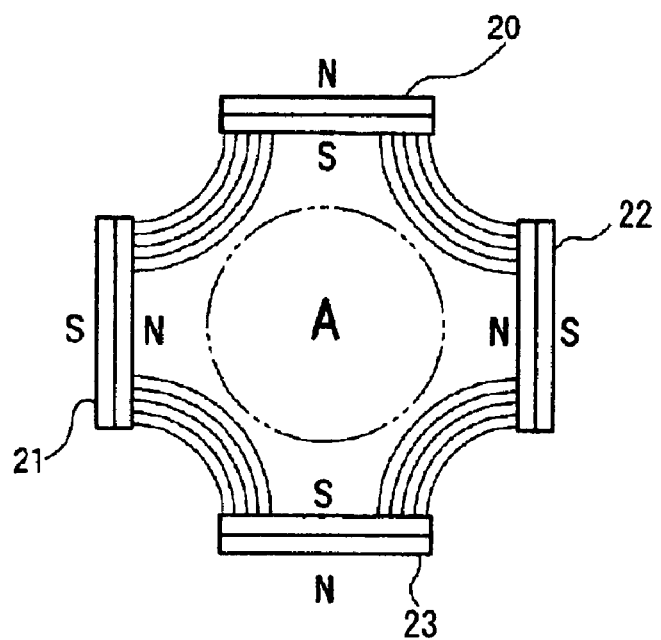
FIG. 3(b) shows states of the lines of magnetic force where only permanent magnets are extracted from FIG. 2 and magnetic poles are determined, in which a state where the permanent magnets are arranged such that the pole of each permanent magnet opposite to that of the adjacent permanent magnet faces the discharge area.

Description will be made of a state of the predetermined magnetic field (1) formed. FIGS. 3(a) and 3(b) show a specific example of the magnetic field space which is surrounded and enclosed by the lines of magnetic force in multiple directions (1). FIGS. 3(a) and 3(b) show states of the lines of magnetic force when the permanent magnets 20 to 23 are extracted from FIG. 2, and the magnetic poles are determined. The lines of magnetic force are represented by a solid curve. Note that the lines of magnetic force shown in FIGS. 3(a) and 3(b) do not represent all possible forms, but represent typical ones.

FIG. 3(a) shows a state where all the permanent magnets 20 to 23 face the S poles toward the discharge area ((1)-a). In this case, the lines of magnetic force emitted from the individual permanent magnets 20 to 23 toward the discharge area repel one another, and thus, the area indicated by A is surrounded by the lines of magnetic force in multiple directions.

FIG. 3(b) shows an arrangement where the permanent magnets 20 and 22 face the S poles toward the discharge area, and the permanent magnets 21 and 23 face the N poles toward the discharge area ((1)-b). That is, the neighboring permanent magnets are arranged so as to face the poles alternately opposite to each other toward the discharge area. In this case, the lines of magnetic force emitted from the individual permanent magnets 20 to 23 toward the discharge area terminate on the neighboring permanent magnets, and thus, the area indicated by A is surrounded by the lines of magnetic force in multiple directions.

As described above, with the forms shown in FIG. 3(a) and FIG. 3(b), the magnetic field in multiple directions acts on the area indicated by A, and when the discharge plasma is generated in the area A, it is estimated that the motion of the charged particles in the discharge plasma is restricted in the space between the electrode 11 and the electrode 12. When the carbon nanotubes are manufactured in this way, it is possible to efficiently synthesize a carbon nanotube with a high purity at a low cost on an industrial basis.

The magnetic field in those forms may be generated by using multiple permanent magnets, and the number of the magnets is not necessarily limited to four.

In the former "form where all the permanent magnets face the same pole toward the discharge area", three, or five or more flat permanent magnets, for example, may be arranged so as to surround the discharge area, or even two magnets may be arranged such that recesses of both of them face each other when curved permanent magnets are used. In addition, there is no upper limit to the number of the permanent magnets. Further, while the S poles face the discharge area in the form shown in FIG. 3(a), it is only necessary to face the same poles toward the discharge area, namely, an arrangement where the N poles face the discharge area may be possible.

In the latter "form where the neighboring permanent magnets are arranged so as to face the poles alternately opposite to each other toward the discharge area", since it is necessary to alternate the pole of the neighboring permanent magnets, it is essential to use even number of permanent magnets. Also, it is necessary to surround the discharge area with lines of magnetic force, so it is essential to use four or more permanent magnets. However, there is no upper limit.

Another example of the predetermined magnetic field in the form of (1) as described above may be a form where the discharge plasma is generated in an internal hole of a permanent magnet in a cylindrical shape.

While the above description is provided for the form (1) of the predetermined magnetic field where the permanent magnets are used, the magnets to be used are not limited to the permanent magnets, and it is possible to use electromagnets or a combination of permanent magnets and electromagnets.

Figure 4A:
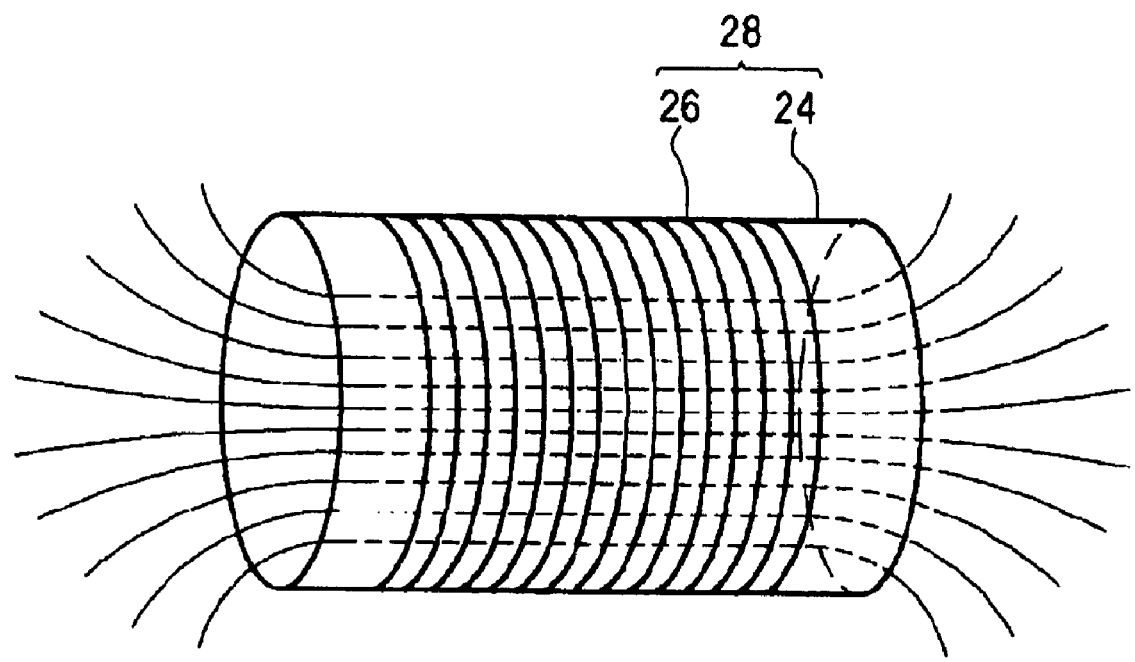
FIG. 4(a) shows a specific example of a magnetic field space where lines of magnetic force are approximately in parallel with the direction of discharge current, and the motion of charged particles in discharge plasma is restricted to the direction of the lines of magnetic force, in which a perspective view shows a state of the lines of magnetic force formed when a voltage is applied to a coil of an electromagnet.
Figure 4B:
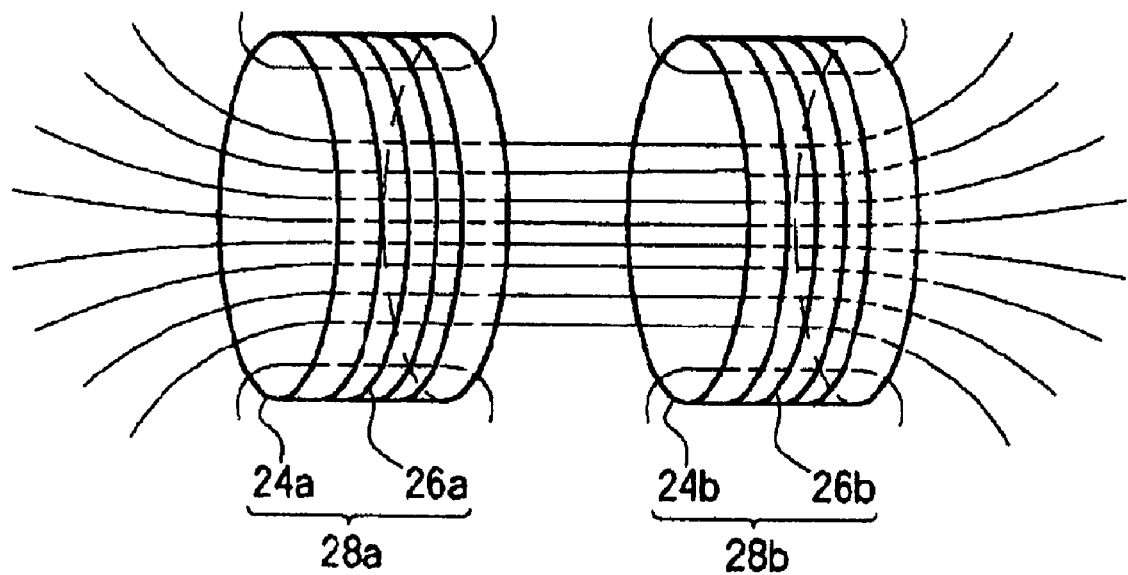
FIG. 4(b) shows a specific example of a magnetic field space where lines of magnetic force are approximately in parallel with the direction of discharge current, and the motion of charged particles in discharge plasma is restricted to the direction of the lines of magnetic force, in which a perspective view shows a state of the lines of magnetic force when electromagnets are disposed on the same axis with an interval, and a voltage is applied to coils of the respective electromagnets.

Description will be made of a state of the predetermined magnetic field (2) formed. FIGS. 4(a) and 4(b) show specific examples of a magnetic field space (2) where the lines of magnetic force are approximately in parallel with the flowing direction of the discharge current, and the motion of the charged particles in the discharge plasma is restricted by the lines of magnetic force. FIG. 4(a) is a perspective view showing a state of the lines of magnetic force formed when a voltage is applied to a coil 26 of an electromagnet 28 obtained by winding the coil 26 on a cylinder 24, and FIG. 4(b) is a perspective view showing a state of the lines of magnetic force formed when electromagnets 28a and 28b obtained in the same way are disposed on the same axis with an interval, and a voltage is applied to coils 26a and 26b wound on individual cylinders 24a and 24b. The lines of magnetic force are represented by a solid curve and a broken curve. Note that the lines of magnetic force shown in FIGS. 4(a) and 4(b) do not represent all possible forms, but represent typical ones, and as for the individual lines of magnetic force, a part of them are shown.

In the form shown in FIG. 4(a), the lines of magnetic force pass through the inside of the cylinder 24. That is, the lines of magnetic force form a flux of lines of magnetic force approximately in parallel inside the cylinder 24. By generating discharge plasma inside the cylinder 24, and approximately matching the direction of the lines of magnetic force inside the cylinder 24 with the flowing direction of the discharge current, it is contemplated that the discharge plasma is confined inside the magnetic field.

In the form shown in FIG. 4(b), the lines of magnetic force pass through the inside of the cylinders 24a and 24b respectively, and simultaneously, a combined magnetic field is formed in the interval between them. In the combined magnetic field, the lines of magnetic force passing through the inside of the cylinders 24a and 24b respectively proceed simply straight, pass through the inside of the other cylinder, and practically form an imaginary single coil although an extremely small portion of the lines of magnetic force leak from the space between the cylinders 24a and 24b. That is, in the space between the cylinders 24a and 24b, the lines of magnetic force form a flux of lines of magnetic force approximately in parallel. By generating discharge plasma in the space between the cylinders 24a and 24b, and approximately matching the direction of the lines of magnetic force in the space between the cylinders 24a and 24b with the flowing direction of the discharge current, it is contemplated that the discharge plasma is confined inside the magnetic field.

It is not necessary to exactly match the direction of the lines of magnetic force inside the cylinder 24 or the space between the cylinders 24a and 24b with the flowing direction of the discharge current. Even when their directions do not match with each other exactly, it is only necessary to form a magnetic field which confines the discharge plasma inside. However, when an angle between the directions is excessively large, the electrodes may be broken due to the relationship among the magnetic field, the electric field, and the force. Therefore, the angle is preferably set to a range of 0° to 30°, and more preferably to a range of 0° to 10°.

In addition, even if the flowing direction of the discharge current does not match exactly with the center axis of the magnetic field, it is only necessary to confine the discharge plasma inside the magnetic field. Note that since the straightness of the discharge plasma is lost if the discharge plasma is generated at a location excessively separated from the center axis of the magnetic field, it is desirable that the axis of the flowing direction of the discharge current exist within 20% of the distance from the center axis of the magnetic field to "the inner surface of the cylinder 24" or "the extension of the inner surface of the cylinders 24a and 24b". Note that when the tip of the electrode is a flat surface, since the discharge plasma is generated while an arbitrary point on the flat surface is serving as a base point. Therefore, although the flowing direction of the discharge current is not constant inherently, it is assumed that the line connecting the centers of the tips of the two electrodes opposed to each other is the flowing direction of the discharge current in the present invention.

Another example of the predetermined magnetic field in the form of (2) may be a form where a troidal electromagnet is used, and the discharge plasma is generated in an internal hole of the electromagnet.

Although the types of the discharge plasma include arc plasma, and glow plasma, arc plasma is preferable for efficiently manufacturing the carbon nanotube. It is possible to selectively manufacture the carbon nanotube by controlling each of the various conditions such as the pressure of the atmosphere in the previously mentioned sealed container.

While in this embodiment, as shown in FIG. 1, the area in which both the tips of the electrodes 11 and 12 are opposed to each other, namely, the generation area of the discharge plasma, is situated in the area surrounded by the permanent magnets 20 to 23 (between an imaginary plane X formed by connecting top ends of the permanent magnets 20 to 23 in the axial direction of the electrode 12 in the drawing and an imaginary plane Y formed by connecting bottom ends of them), the permanent magnets 20 to 23 do not necessarily surround directly the generation area of the discharge plasma, but may surround its neighboring area. This is because the magnetic field due to the permanent magnets 20 to 23 is also formed in the neighboring area surrounded by the permanent magnets 20 to 23, and the discharge plasma is properly confined in the magnetic field.

Since the distance of the electrode 12 from the imaginary plane Y (the area which can be considered to be the neighboring area surrounded by the permanent magnets 20 to 23) is determined so that the magnetic field formed by the permanent magnets 20 to 23 affects the generation area of the discharge plasma between the electrodes 11 and 12, the distance is automatically determined according to the magnetic force of the permanent magnets 20 to 23 and the like. Specifically, it is preferable to set the distance within a range which satisfies "the magnetic flux density in the discharge area" described later.

Note that it is preferable that the generation area of the discharge plasma be separated from the center of the area surrounded by the permanent magnets 20 to 23 (the center between the imaginary plane X and the imaginary plane Y) by a certain distance. At the center of the area surrounded by the permanent magnets 20 to 23, the direction of the formed magnetic field is, in most cases, orthogonal to the axial direction of the electrode 12, or the magnetic field is hardly formed since components of the magnetic field cancel out. When the generation area is displaced from the center position, the intensity of the magnetic field increases or the magnetic flux density of the magnetic field having the vector component effective in confining the discharge plasma increases further. Under this condition, a preferable area exists even in the neighborhood of the area surrounded by the permanent magnets 20 to 23. Specifically, as described above, this area is within the range which satisfies "the magnetic flux density in the discharge area" described later.

The range of the interval between both the tips of the electrodes 11 and 12 is selected from the range enough to generate discharge plasma, and is automatically determined according to the voltage drop. In general, the interval maybe selected from a range of about 0.1 to 5 mm.

Figure 5A:
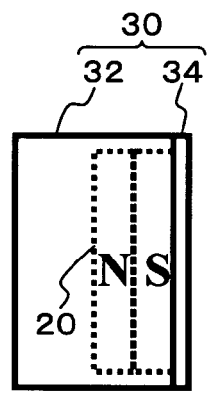
FIG. 5(a) shows a schematic view showing states where a permanent magnet is surrounded by heat releasing members, in which a side view shows the vicinity of the permanent magnet to which the heat releasing members are attached.
Figure 5B:
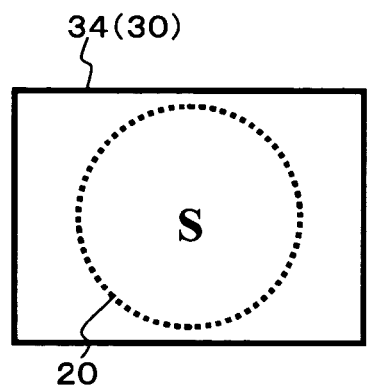
FIG. 5(b) shows a front view seen from the right side in FIG. 5(a)

As shown in FIGS. 1 and 2, the individual permanent magnets 20 to 23 are completely surrounded by the heat releasing members 30 which are parts of the cooling unit. FIGS. 5(a) and 5(b) show schematic views showing states where the permanent magnet 20 as a representative is surrounded by the heat releasing members. FIG. 5(a) shows a side view of the vicinity of the permanent magnet to which the heat releasing member is attached, and FIG. 5(b) shows a front view seen from the right side in FIG. 5(a). In FIGS. 5(a) and 5(b), the permanent magnet 20 is represented by a dotted line, is embedded into a copper cluster 32 in a block shape, and is simultaneously covered by a copper cover 34. Thus the permanent magnet 20 is completely surrounded by the heat releasing member 30 including the copper cluster 32 and the copper cover 34. This holds true of the other permanent magnets 21 to 23.

This heat releasing member 30 releases the heat from the permanent magnet 20, and restrains the heat accumulation. While the material of the heat releasing member 30 is copper in this embodiment, the material is not limited to copper. Any material which has high heat conductivity, or a high withstand temperature is applicable, and especially copper and carbon (graphite), which have high heat conductivity, and tungsten, molybdenum, and tantalum, which have high withstand temperatures, are preferable.

In this embodiment, as shown in FIGS. 1 and 2, a tube (cooling tube) 36 across the insides of the four heat releasing members 30 enclosing the permanent magnets 20 to 23, and a tube (cooling tube) 38 surrounding the outsides of the heat releasing members 30 are respectively installed, and water circulates through those tubes.

In this embodiment, since the heat releasing members 30 release heat from the permanent magnets 20 to 23, and further, the heat releasing members 30 are cooled by the water circulating through the tubes 36 and 38, the heating of the permanent magnets 20 to 23 is efficiently restrained. Note that, the coolant circulating through the tubes 36 and 38 is not limited to water, and any conventional publicly known coolant, whether it is liquid or gas, is applicable. Specific examples of the coolant other than water include nitrogen gas, ethylene glycol, liquid nitrogen, and liquid helium. In addition, a material with high heat conductivity is preferable for the material of the tubes 36 and 38, and a material similar to that of the heat releasing member 30 is suitably applied.

While in this embodiment, the form where both the heat releasing member and the forced cooling using the coolant are combined is described as an example of the cooling unit, it is not necessarily to combine both of them, and it is possible to properly select either of them, or to combine with another cooling unit as long as a desired cooling effect is achieved. Whenever any one of those cooling units is used, it is preferable to use the cooling unit for controlling such that the temperature of the permanent magnets 20 to 23 does not reach Curie temperature during manufacturing of the carbon nanotube.

Examples of the cooling unit include: a unit which uses a fan to blow air to the magnets and/or other cooling units; and a unit which uses a Peltier element to cool the magnets and/or other cooling units.

In this embodiment, since the cooling unit takes a form where both the heat releasing member and the forced cooling with the coolant are combined, a member in a cluster shape is used so as to efficiently conduct heat to the coolant. However, in a form where only the heat releasing member is used, the heat releasing member is combined with a fan, or the like, it is preferable to use an increased surface area such as a form including a large number of fins so as to increase the heat releasing efficiency.

On the other hand, in this embodiment, although the two tubes 36 and 38 are provided as the cooling tubes, it should be understood that two tubes are not always necessary, and one tube or three or more tubes may be used according to desired cooling efficiency.

The reaction container (chamber) 10 is a sealed container in a cylindrical shape (disposed such that the end surfaces face upward and downward respectively in the drawing), and although the container is preferably made of metal, especially stainless steel, the container may be suitably made of an aluminum alloy, quartz, and the like. Additionally, the shape is not limited to a cylindrical shape, and a desired shape such as a box shape may be used. Further, when the atmosphere of the discharge area is an atmosphere of air at an atmospheric pressure, and the carbon nanotubes are deposited around the tip of the electrode 11, the reaction container 10 is not indispensable, or the reaction container 10 is not necessarily a sealed container.

The two electrodes 11 and 12 whose tips are opposed to each other are disposed in the reaction container 10. Under this condition, when the material of the reaction container 10 is the one having electrical conductivity such as metal, the reaction container 10 and the electrodes 11 and 12 are fixed while they are electrically insulated from each other. As the arrangement of the two electrodes 11 and 12, such an arrangement that the axes of the two electrodes 11 and 12 have a certain angle and the tips are close to each other is possible in addition to the arrangement shown in FIG. 1 where the axes of both the electrodes coincide with each other so that both the electrodes are opposed to each other exactly. Also, the porous carbonaceous material to be used for the electrode 12 serving as the anode has an irregular shape depending on the manufacturing method therefor. However, in the case of using such an irregular-shaped electrode, a flat surface having a desired area in an outer surface of the irregular-shaped electrode may be regarded as the tip, and brought close to the tip of the electrode on the other side. The expression "tips are opposed to each other" used in the present invention is a concept also including the above-mentioned case, but of course, desirably represents the form shown in FIG. 1 (state where the axes of the two electrodes coincide with each other so that both of them are opposed to each other exactly)

As for the arrangement of the electrodes 11 and 12, when the opposing surfaces of the electrodes 11 and 12 are in parallel with each other, the discharge such as arc discharge is stabilized, and the carbon nanotube is synthesized efficiently.

In this embodiment, the above-mentioned porous carbonaceous material is used as the electrode 12. In the case of manufacturing the carbon nanotube by arc discharge, carbon contained in the electrode 12 as the anode is a main component of the raw material. Thus, by using the porous carbonaceous material having a low cost and easy availability as the electrode 12, it can be reliably achieved to reduce the cost for manufacturing the carbon nanotube, which is an object of the present invention. Of course, the porous carbonaceous material may be used for the electrode 11 serving as the cathode.

The material of the electrode 11 is desirably selected from various carbonaceous materials including the porous carbonaceous material (particularly, a graphite rod). However, any substance that contains carbon and has an electric resistivity within a range of 0.01 $\Omega \cdot cm$ to 10 $\Omega \cdot cm$ (preferably 0.01 $\Omega \cdot cm$ to 1 $\Omega \cdot cm$) can be suitably used.

The shape of the electrode 11 is not particularly limited, and although examples of the shape may include: a cylindrical shape; a rectangular column shape; and a truncated cone shape, the cylindrical shape is desirable. In addition, although the diameters of the tips (in the case where the tip is not circular, the diameter of a circle having the same area as the tip) of the two electrodes 11 and 12 are not especially limited, each of the diameters is preferably 1 mm or more and 100 mm or less.

As for the opposing two electrodes 11 and 12, the area of the tip of the electrode 11 is preferably equal to or less than the area of the tip of the electrode 12. The purity of the obtained carbon nanotube increases further when the area of the tip of the electrode 11 is equal to or less than the area of the tip of the electrode 12. The ratio of the areas between them (the tip area of the electrode 11/the tip area of the electrode 12) is preferably 0.1 to 0.9, and more preferably 0.2 to 0.5.

A coolant circulating pipe (not shown) as an electrode cooling unit is attached to the holders 41 and 42 holding the two opposing electrodes 11 and 12. The heat generated when the discharge plasma is generated heats the electrodes 11 and 12. The shape of the electrodes changes when the electrodes are heated to high temperatures, and the discharge condition may change. When the heating progresses to an extremely high temperature, the carbon nanotube deposited at the tip of the electrode may be decomposed again or vaporized. However, since the coolant circulating pipe attached to the holders 41 and 42 restrains the electrodes 11 and 12 from being heated, and thus, it is possible to maintain stably generating the discharge plasma for even a longer period of time.

Though the routing of the coolant circulating pipe is not especially restricted, it is preferable to efficiently route to effectively cool the electrodes 11 and 12. There is also no restriction to the material of the coolant circulating pipe and the type of the coolant, and it is possible to properly apply ones similar to the tubes 36 and 38 and the coolant, referred in the description for the magnetism generating member cooling unit.

Copper having high heat conductivity is also used for the holders 41 and 42. Thus, the holders 41 and 42 serve by themselves in a way similar to the heat releasing member 30 referred in the description for the magnetism generating member cooling unit. In this respect, the structure itself of the holders 41 and 42 can be considered as a type of the electrode cooling unit.

The electrode cooling unit is not limited to the constitution described above, and a constitution in which the individual electrodes can be cooled may be used without problems. Examples of the constitution may include the fan and the fin type heat releasing member referred in the description for the magnetism generating member cooling unit.

Note that while both of the holders 41 and 42 are constituted so as to serve also as the electrode cooling unit in this embodiment, only one electrode may be provided with the electrode cooling unit. It is of course desirable that both of the electrodes are provided with the electrode cooling unit. However, if only one electrode is provided with the electrode cooling unit, the cathode on which the carbon nanotube is generated and deposited is preferably provided with the electrode cooling unit.

By using the atmosphere adjusting unit including the vacuum pump 14, the gas cylinder 17, the inlet tube 15, and the valve 19 to properly adjust the atmosphere inside the reaction container 10, the atmosphere in the discharge area is set to a desired state. Specifically, the vacuum pump 14 can compress and decompress the inside of the reaction container 10. After the inside of the reaction container 10 is decompressed by the vacuum pump 14, the valve 19 is opened, and desired gas stored in the gas cylinder 17 is introduced into the reaction container 10 through the inlet tube 15, thereby obtaining the desired gas atmosphere. It should be understood that the operation for adjusting the atmosphere is not necessary when the atmosphere is the atmosphere of air at the atmospheric pressure.

The vacuum pump 14 may be a rotary pump, a diffusion pump, a turbo molecule pump, or the like.

The pressure of the atmosphere inside the reaction container 10 (namely, the atmosphere in the discharge area, used in the same sense hereafter) maybe 0.01 Pa or more and 510 kPa or less, preferably, 0.1 Pa or more and 105 kPa or less, and more preferably 13 Pa or more and 70 kPa or less. Under such a pressure, the carbon nanotube with a high purity can be manufactured.

Although the atmospheric gas in the reaction container 10 is not specifically limited, air, helium, argon, xenon, neon, nitrogen, hydrogen, and mixture of these types of gas are preferable. When desired gas is introduced, after the inside of the reaction container 10 is exhausted by the vacuum pump 14, from the gas cylinder 17 that contains the desired gas, the gas may be introduced up to a predetermined pressure.

In the present invention, the atmosphere inside the reaction container 10 may further store gas including a material containing carbon. In this case, the atmosphere may only include the gas including the material containing carbon, or the gas including the material containing carbon may be introduced into the atmosphere of the different types of gas described above. By adding the gas including the material containing carbon to the atmosphere, it is possible to produce the carbon nanotube with a special structure. This carbon nanotube has a structure of carbon grown around a carbon nanotube as the center.

Although the applicable material containing carbon is not limited thereto, hydrocarbon such as ethane, methane, propane, and hexane; alcohol such as ethanol, methanol, and propanol; ketone such as acetone; petroleum; gasoline; or inorganic substance such as carbon monoxide, and carbon dioxide; or the like, can be used. Acetone, ethanol, and hexane are especially preferable.

Anything that generates magnetic force may be used as the permanent magnets 20 to 23 serving as magnetism generating member. As described above, the electromagnet may be applied in place of the permanent magnet. Examples of the predetermined magnetic field to be formed include ones with the shape shown in FIGS. 3(*a*), 3(*b*), 4(*a*), and 4(*b*) as described above. In the carbon nanotube manufacturing apparatus in FIG. 1, the two types of magnetic fields shown in FIGS. 3(*a*) and 3(*b*) are selectable.

In the predetermined magnetic field to be formed, when the lines of magnetic force in the discharge area include more components which are approximately in parallel with the axes of the electrodes 11 and 12 (namely, the flowing direction of the discharge current formed between the electrodes 11 and 12), the high-purity carbon nanotube is manufactured, and thus, this condition is preferable. That is, the magnetic field in FIG. 3(*a*) is preferable to the one in FIG. 3(*b*). The arrangement in FIG. 3(*a*) is used in this embodiment.

In the carbon nanotube manufacturing apparatus of FIG. 1 on which the conditions described above are set, by applying the voltage from the power supply 18 between the electrodes 11 and 12, discharge plasma is generated between the electrodes 11 and 12. Although the types of the discharge plasma include arc plasma, glow plasma, and the like, arc plasma is preferable for efficiently manufacturing carbon nanotubes such as carbon nanotubes.

When conducting the arc discharge, contact arc process may be conducted before the arc discharge. The contact arc process is a process where, after the voltage is applied while the electrodes 11 and 12 are in contact with each other, the moving apparatus 13 separates the electrodes 11 and 12 to a certain inter-electrode distance, and the discharge plasma is generated. With this process, stable discharge plasma is generated easily and quickly.

Though the voltage applied between the electrodes 11 and 12 may be DC or AC, DC is preferable for increasing the purity of the obtained carbon nanotube. When AC is applied, there is no distinction between the electrodes 11 and 12 in terms of polarity.

The current density of the discharge when the discharge plasma is generated is preferably 0.05 A/mm$^2$ or more and 15 A/mm$^2$ or less, and more preferably 1 A/mm$^2$ or more and 5 A/mm$^2$ or less with respect to the area of the tip of the electrode generating the discharge plasma. Here, "the electrode generating the discharge plasma" means the cathode when the applied voltage is DC, and when the applied voltage is AC, it means the electrode with the smaller tip area (this holds true throughout other provisions in the present invention).

The voltage applied between the electrodes 11 and 12 by the power supply 18 is preferably 1 V or more, and 30 V or less, and more preferably 15 V or more and 25 V or less. Since as a result of the discharge, the tip of the electrode 12 is consumed, the interval between the electrodes 11 and 12 changes during the discharge. It is preferable to control the voltage between the electrodes 11 and 12 to become constant by properly adjusting the interval between the electrodes 11 and 12 using the moving apparatus 13.

The magnetic flux density in the predetermined magnetic field is preferably $10^{-5}$ T or more and 1T or less at the tip outside edge of the electrode generating the discharge plasma of the two opposing electrodes 11 and 12. When the magnetic flux density is less than $10^{-5}$ T, it is difficult to form an effective magnetic field, and when the magnetic flux density exceeds 1 T, it may be difficult to dispose the permanent magnets 20 to 23, which generate the magnetic field inside the apparatus, close to the generation area of the discharge plasma. Thus, both the cases are not preferable. When the magnetic flux density is $10^{-4}$ T or more and $10^{-2}$ T or less, since stable discharge is generated, it is possible to efficiently generate the carbon nanotube.

When the discharge plasma is generated between the electrodes 11 and 12 as described above, carbon is separated from the surface of the electrode 11, and then reacts to generate the carbon nanotube. The generated carbon nanotube are deposited on the surface of the tip of the electrode 11, a neighborhood of it, and also the inner wall of the reaction container 10. That is, the porous carbonaceous material of the electrode 12 becomes a source for supplying carbon as the raw material of a carbon nanotube. The porous carbonaceous material thus serving as the source for supplying the raw material is extremely inexpensive, and the manufacturing method using the discharge plasma by which a relatively high-purity carbon nanotube is likely to be obtained (particularly, arc discharge) is adopted for the manufacture. Therefore, using the manufacturing method according to this embodiment of the present invention, the high-purity carbon nanotube can be efficiently manufactured at an extremely low cost.

Also, according to this embodiment, at least the magnetic field having the lines of magnetic force in multiple directions (or the magnetic field having the component parallel with the flowing direction of the discharge current) is formed in the generation area of the arc discharge (discharge plasma), the higher-purity can be attained especially for the carbon nanotube to be obtained.

Further, according to this embodiment, the magnetism generating member cooling units (the heat releasing members 30 and the tubes 36 and 38) for cooling the permanent magnets 20 to 23 are provided, thereby suppressing heating of the permanent magnets 20 to 23. Therefore, the discharge plasma can be generated in a stable manner for long period of time, so that the extremely high-purity carbon nanotube can be manufactured with high efficiency.

As described above, according to the present invention, in a discharge plasma method such as the arc discharge capable of manufacturing the relatively high-purity carbon nanotube with ease, the inexpensive porous carbonaceous material is used for at least one of the electrodes as the source for supplying the raw material. Therefore, the carbon nanotube can be manufactured at an extremely low cost.

Note that this embodiment is an example for implementing the present invention, and may be variously modified by those skilled in the art based on conventionally known findings within a scope of matters including the structural elements of the present invention.

EXAMPLE

Hereinafter, description will be made of an example of the present invention. However, the present invention is not limited to the example.

Figure 6:
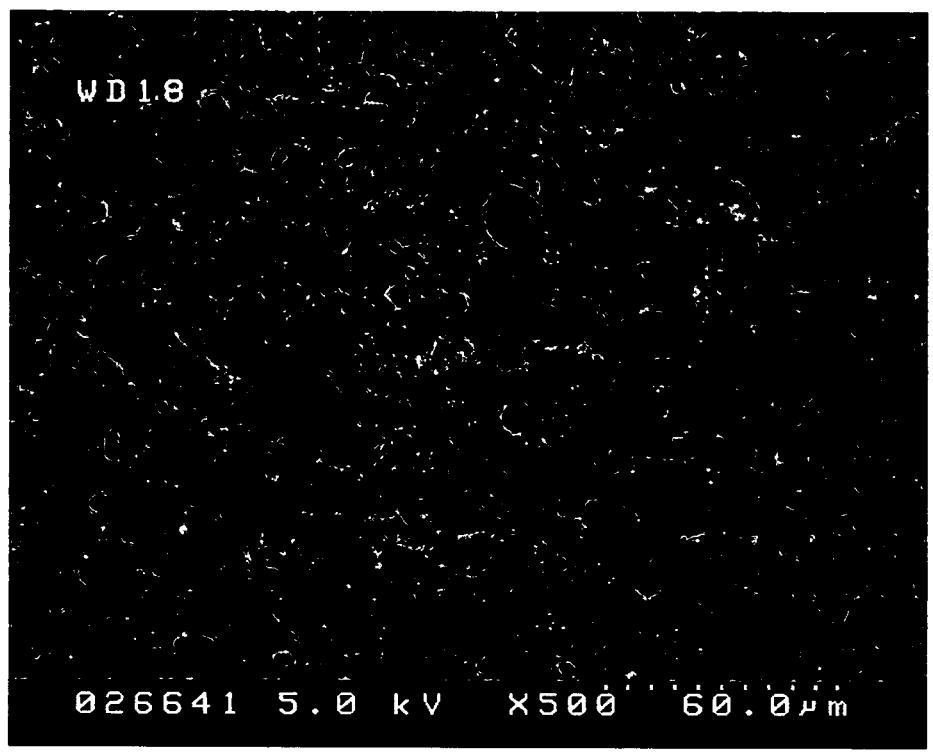
FIG. 6 is a scanning electron microscope photograph (at a magnifying power of 500) of a surface of binchotan charcoal used in an example of the present invention.

The manufacturing apparatus shown in FIG. 1 is used to manufacture a carbon nanotube. At this time, binchotan charcoal serving as the porous carbonaceous material is used as the electrode 12 (anode). The binchotan charcoal to be used is subjected to the dehydration process by the heat dehydration method at 200° C. in the atmosphere for two hours. FIG. 6 is a scanning electron microscope (SEM) photograph (at a magnifying power of 500) of a surface of the binchotan charcoal used in this example. It is observed from the photograph that there exist a number of holes on the surface of the binchotan charcoal.

Note that for the observation using the scanning electron microscope, a scanning electron microscope S-4500 manufactured by Hitachi Ltd., was used. Also, the magnifying power for the photograph has an error to a certain degree depending on the extent to which the photograph was enlarged. (The above description in this paragraph holds true of other cases of observation using the scanning electron microscope in this embodiment.)

Hereinafter, description will be made of other specific requirements for the individual constitution.

Reaction container 10: A cylindrical container chamber made of stainless steel. 210 mm in diameter and 380 mm in length.

Electrode (cathode) 11: A cylindrical graphite rod with an outer diameter of 5 mm (purity: 99.9% or more).

Electrode (anode) 12: The binchotan charcoal processed into a cylindrical shape with an outer diameter of 15 mm.

Tip position of the electrode 11: 9 mm below the midpoint between the imaginary plane X and the imaginary plane Y (2 mm above the imaginary plane Y).

Moving apparatus 13: Capable of moving the electrode 11 with a stepping motor. Adjusts to maintain the interval between the electrodes 11 and 12 constant during plasma discharge.

Power supply 18: A DC arc welding power supply (Osaka Denki AR-SB300) controlling the current from 20 A to 300 A.

Permanent magnets 20 to 23: Cylindrical NdFB permanent magnets with a diameter of 22 mm and a thickness of 10 mm (Niroku Seisakusho). The permanent magnets 20 to 23 are incorporated as the cooling unit, which are embedded into the heat releasing member 30 (length: 50 mm, width: 40 mm, thickness: 25 mm, and the thickness of the copper cover 34: 2.5 mm). The copper tubes 36 and 38 are further routed, the coolant is circulated through the tubes 36 and 38, and the temperature is controlled so as to maintain the temperature of the permanent magnets 20 to 23 within 100° C. during the discharge. As a result, the temperature of the permanent magnets 20 to 23 does not exceed Curie point during the discharge. The minimum distance between the opposing permanent magnets is 82 mm. The magnetic flux density at the edge of the tip of the electrode 11 is 7 mT.

Holder 41: A copper cylinder with a diameter of 30 mm and a length of 80 mm. The coolant circulating pipe through which water circulates is routed inside the holder so as to control the temperature at the tip of the electrode 11 within 300° C.

Holder 42: A copper cylinder with a diameter of 40 mm and a length of 120 mm. The coolant circulating pipe through which water circulates is routed inside the holder so as to control the temperature at the tip of the electrode 12 within 300° C.

The manufacturing apparatus described above was used to manufacture the carbon nanotube. The inside of the reaction container 10 was not decompressed, and the carbon nanotube was manufactured at 101.325 kPa (one atmospheric pressure). To generate arc discharge between the electrodes 11 and 12, the contact arc process was conducted first, and then, the electrodes 11 and 12 were separated by 0.5 mm to 2 mm after the start of the discharge. The voltage applied by the power supply 18 is DC25V. The arc discharge was conducted under the conditions described above while 60 seconds was set as the discharge period. The current was 85 A, and the discharge current density with respect to the tip area of the electrode 11 was 4.3 A/mm$^2$.

After discharging, the electrode 11 was taken out, and a tip thereof was observed by the above-mentioned scanning electron microscope at magnifying powers of 100 and 5000. The scanning electron microscope (SEM) photographs at this time are shown in FIG. 7 (magnifying power of 100) and FIG. 8 (magnifying power of 5000).

Also, the permanent magnets 20 to 23 and the members accompanying the permanent magnets 20 to 23 (heat releasing members 30, and tubes 36 and 38) are taken out from the manufacturing apparatus structured as described above, and then the carbon nanotube is manufactured in the same manner as above. Further, after discharging, the tip of the electrode 11 was similarly observed by the scanning electron microscope. The SEM photographs at this time are shown in FIG. 9 (magnifying power of 100) and FIG. 10 (magnifying power of 5000).

As is apparent from those SEM photographs, the carbon nanotube can be manufactured by using the binchotan charcoal that is available at a low cost. The binchotan charcoal used in this example costs about 0.3 yen per gram, which means that the cost for the material is remarkably lower than a high-purity graphite that costs about 26 yen per gram. Thus, the manufacturing cost for the carbon nanotube is greatly reduced.

Figure 7:
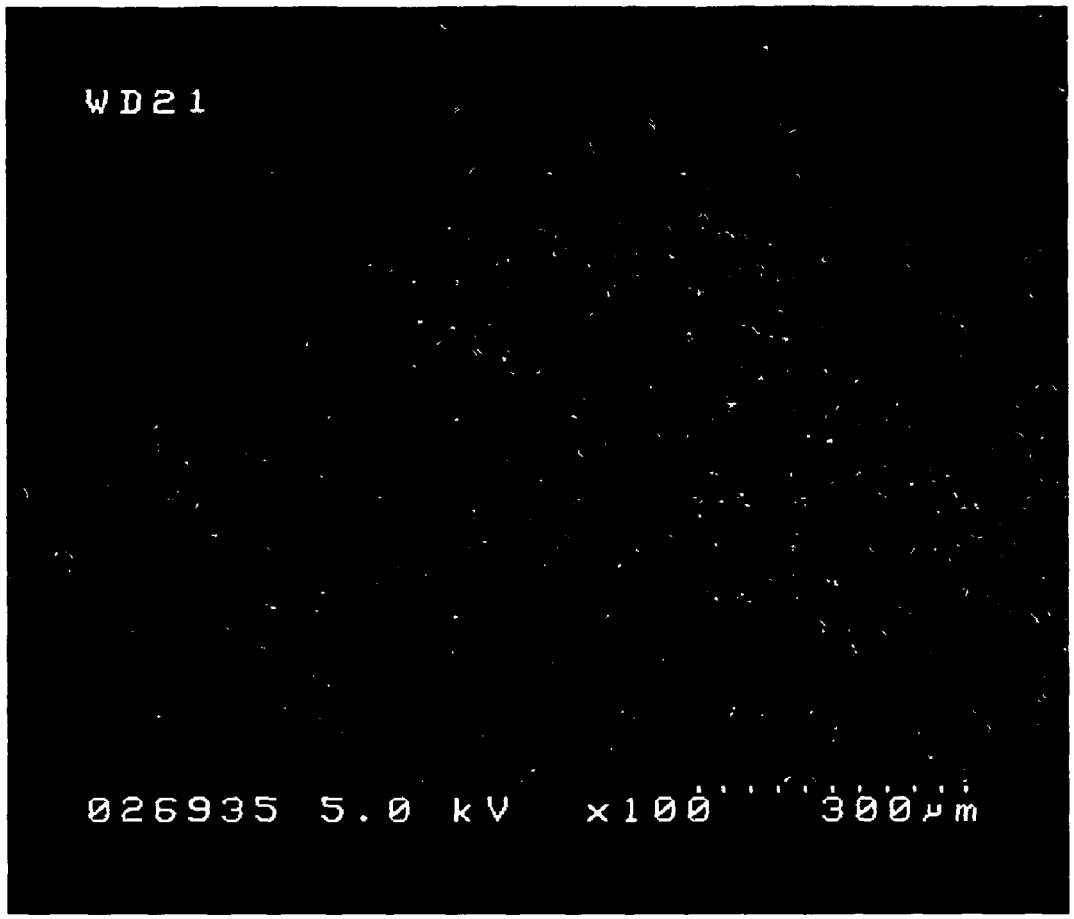
FIG. 7 is a scanning electron microscope photograph (at a magnifying power of 100) of a surface of a cathode to which a carbon nanotube manufactured by using a permanent magnet in the example of the present invention is adhered.
Figure 8:
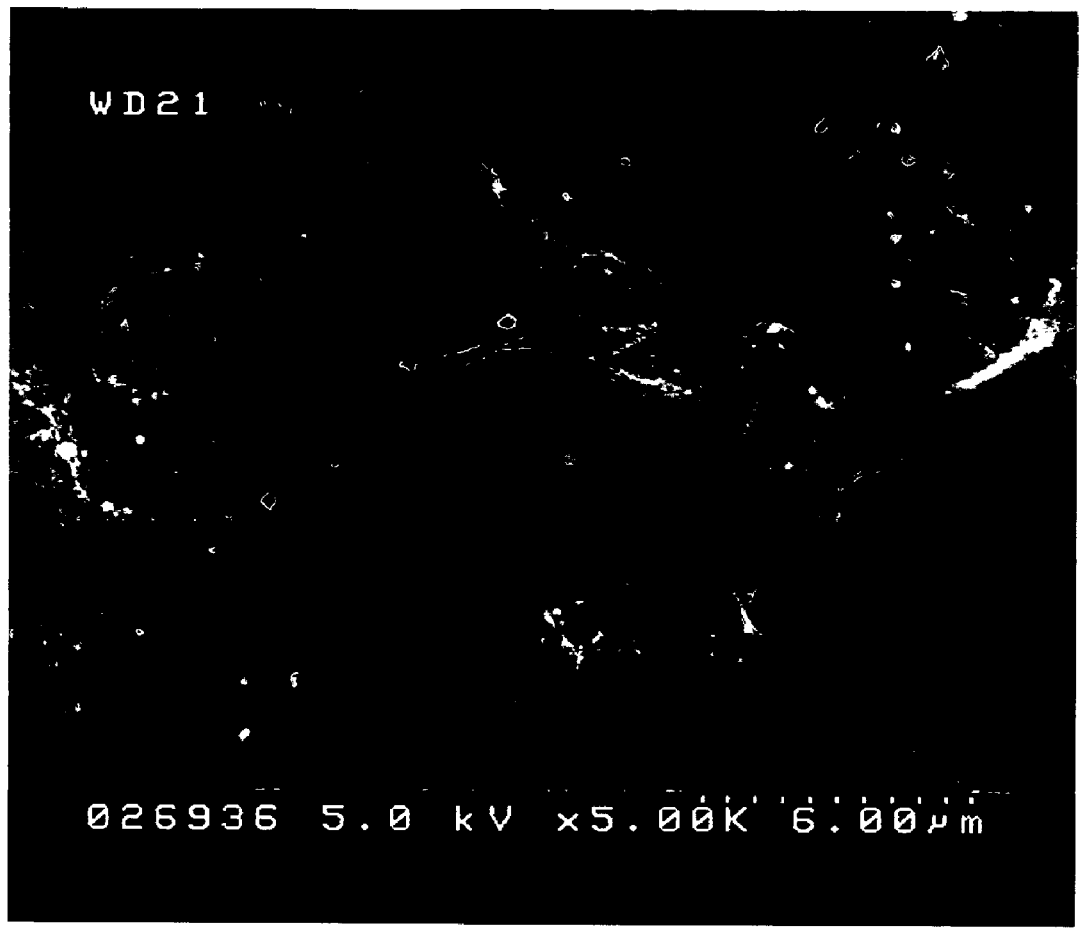
FIG. 8 is a scanning electron microscope photograph (at a magnifying power of 5000) of the surface of the cathode to which the carbon nanotube manufactured by using the permanent magnet in the example of the present invention is adhered.
Figure 9:
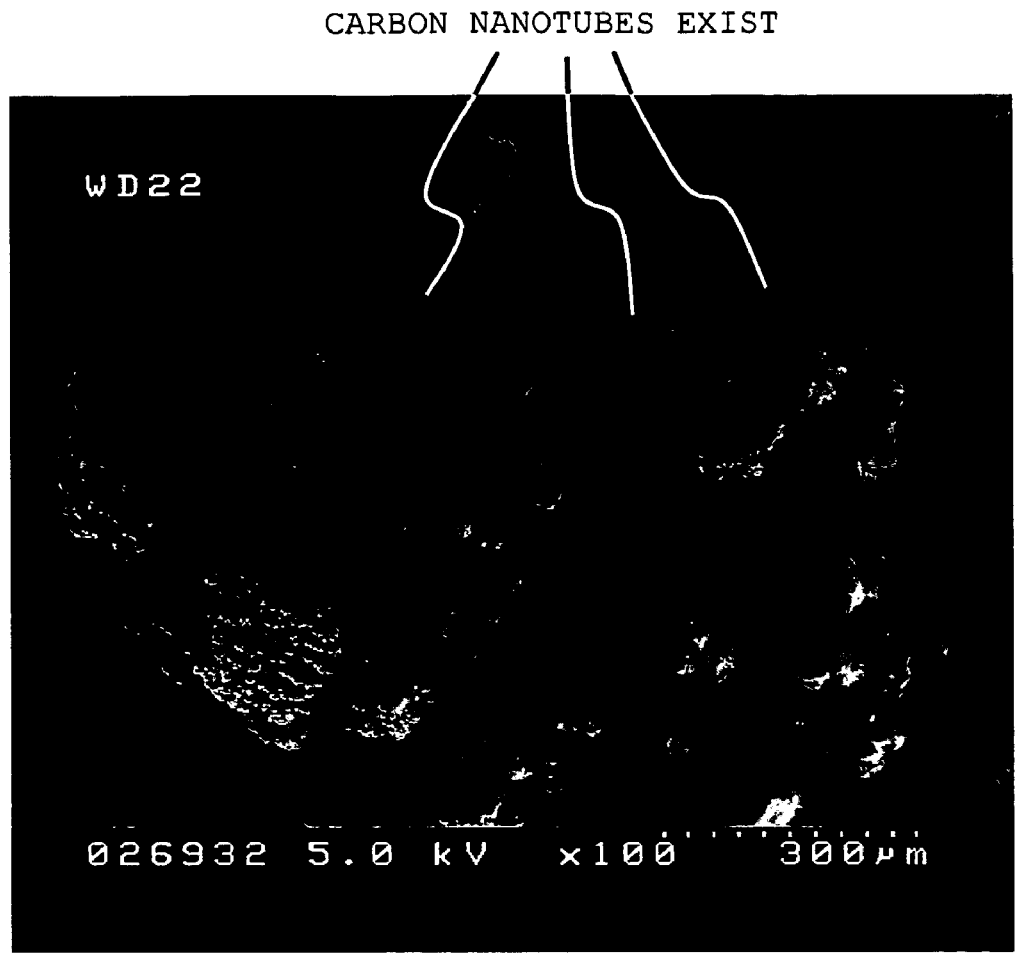
FIG. 9 is a scanning electron microscope photograph (at a magnifying power of 100) of a surface of a cathode to which a carbon nanotube manufactured without using a permanent magnet in the example of the present invention is adhered.
Figure 10:
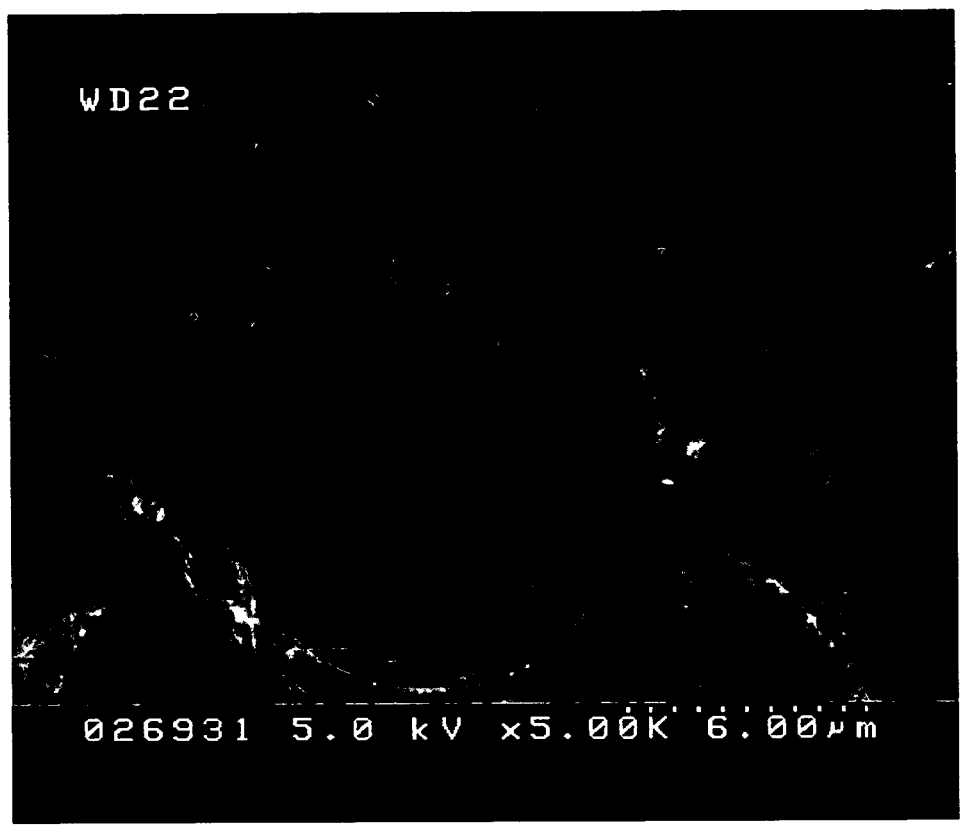
FIG. 10 is a scanning electron microscope photograph (at a magnifying power of 5000) of the surface of the cathode to which the carbon nanotube manufactured without using the permanent magnet in the example of the present invention is adhered.

Also, in the SEM photographs of FIGS. 7 and 8 showing the carbon nanotube manufactured by arranging the permanent magnets 20 to 23, compared with the SEM photographs of FIGS. 9 and 10 showing the carbon nanotube manufactured by removing the permanent magnets 20 to 23, the area where the carbon nanotubes exist is wider across the entire tip of the electrode 11. In addition, compared to the latter case, it is observed that the carbon nanotube obtained in the former case has a higher purity.

As is apparent from the above, it is effective from the viewpoint of the increase in the purity of the carbon nanotube and the manufacturing efficiency to include the permanent magnets 20 to 23 for forming, in the generation area of the discharge plasma, at least: the magnetic field having the lines of magnetic force in the multiple directions; or the magnetic field having the component parallel with the flowing direction of the discharge current. Note that the permanent magnets 20 to 23 are not essential elements for the present invention.

As has been described above, according to the present invention, the discharge plasma method is adopted, and the porous carbonaceous material whose unit price is low is used as the material for the electrode. Accordingly, it is possible to provide a manufacturing apparatus and method for a carbon nanotube, which are capable of manufacturing the carbon nanotube at a low cost.

At this time, by forming, in the generation area of the discharge plasma, at least: the magnetic field having the lines of magnetic force in the multiple directions; or the magnetic field having the component parallel with the flowing direction of the discharge current, it is possible to provide a manufacturing apparatus and method for a carbon nanotube, which are capable of manufacturing the carbon nanotube that is inexpensive and has a further higher purity.

What is claimed is:

1. A manufacturing method for a carbon nanotube, comprising:
    applying a voltage between two electrodes whose tips are opposed to each other;
    generating discharge plasma in a discharge area between the two electrodes; and
    using an electrode made of a porous carbonaceous material, wherein said porous carbonaceous material is charcoal as at least one of the two electrodes whose tips are opposed to each other.

2. A manufacturing method for a carbon nanotube according to claim 1, further comprising subjecting the porous carbonaceous material to a dehydration process prior to the generating of the discharge plasma in the discharge area between the two electrodes.

3. A manufacturing method for a carbon nanotube according to claim 1, wherein the charcoal is binchotan charcoal or bamboo charcoal.

4. A manufacturing method for a carbon nanotube according to claim 1, wherein the porous carbonaceous material is a charcoal processed more than 700° C.

5. A manufacturing method for a carbon nanotube according to claim 1, wherein the porous carbonaceous material is a charcoal processed in a range of 850~2500° C.

6. A manufacturing method for a carbon nanotube according to claim 1, wherein the porous carbonaceous material is a charcoal processed in a range of 1000~2500° C.

7. A manufacturing method for a carbon nanotube according to claim 1, further comprising using the electrode made of the porous carbonaceous material as at least an anode of the two electrodes whose tips are opposed to each other.

8. A manufacturing method for a carbon nanotube according to claim 1, further comprising forming, in a generation area of the discharge plasma, at least a magnetic field having lines of magnetic force in multiple directions or a magnetic field having a component in parallel with a flowing direction of a discharge current.

9. A manufacturing method for a carbon nanotube according to claim 1, wherein the discharge plasma generated in the discharge area is arc plasma.

* * * * *